US009569541B2

(12) United States Patent
Andersen et al.

(10) Patent No.: US 9,569,541 B2
(45) Date of Patent: Feb. 14, 2017

(54) EVALUATING PREFERENCES OF CONTENT ON A WEBPAGE

(75) Inventors: Reid Andersen, Seattle, WA (US); David Max Chickering, Bellevue, WA (US); Ewa Dominowska, Kirkland, WA (US); Matt Jacobsen, La Jolla, CA (US); Anton Mityagin, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 490 days.

(21) Appl. No.: 12/650,713

(22) Filed: Dec. 31, 2009

(65) Prior Publication Data

US 2011/0161308 A1     Jun. 30, 2011

(51) Int. Cl.
*G06F 17/30* (2006.01)

(52) U.S. Cl.
CPC .............................. *G06F 17/30867* (2013.01)

(58) Field of Classification Search
None
See application file for complete search history.

(56) References Cited

U.S. PATENT DOCUMENTS

| | | | | |
|---|---|---|---|---|
| 7,000,242 B1 * | 2/2006 | Haber | ................ | G06F 17/30274 715/719 |
| 7,596,558 B2 | 9/2009 | Brewer et al. | | |
| 7,631,035 B2 * | 12/2009 | Kasriel | ............. | G06F 17/30876 709/203 |
| 7,730,397 B2 * | 6/2010 | Tischer | ......................... | 715/247 |
| 8,005,857 B2 * | 8/2011 | Farago | .................. | G06F 3/0485 707/769 |
| 8,156,444 B1 * | 4/2012 | Lawrence | .............. | H04N 7/162 715/273 |
| 2002/0156704 A1 * | 10/2002 | Kolls | ................. | G06Q 30/0601 705/26.1 |
| 2002/0165856 A1 | 11/2002 | Gilfillan et al. | | |
| 2003/0071846 A1 * | 4/2003 | Balassanian | .................. | 345/769 |
| 2006/0235860 A1 | 10/2006 | Brewer et al. | | |
| 2007/0078815 A1 * | 4/2007 | Weng | ................ | G06F 17/30401 |
| 2007/0083560 A1 * | 4/2007 | Choi et al. | .................. | 707/104.1 |
| 2007/0130525 A1 * | 6/2007 | Murphy et al. | ............... | 715/747 |

(Continued)

OTHER PUBLICATIONS

Ian Sheldon; "Google Search Wiki—What Does This Mean for Search Engine Optimisation?"; Ezine @rticles published Nov. 24, 2008; 2 pages; http://ezinearticles.com/?Google-Search-Wiki---What-Does-This-Mean-For-Search-Engine-Optimisation?&id=1723823.

(Continued)

*Primary Examiner* — Bai D. Vu
(74) *Attorney, Agent, or Firm* — Jessica Meyers; Tom Wong; Micky Minhas (57) ABSTRACT

Systems, methods, and computer storage media having computer-executable instructions embodied thereon that facilitate evaluation of digital content preferences are provided. A user is presented with items of digital content and permitted to manipulate the arrangement of the digital content items in the context of a layout area. Based on the user's manipulation of the digital content items, a user preference regarding an arrangement of digital content, such as a location preference, a position preference, and/or a usage preference, is identified. In embodiments, such a user preference can be utilized to later display digital content to a user in accordance therewith.

18 Claims, 7 Drawing Sheets

(56) References Cited

U.S. PATENT DOCUMENTS

| | | | | |
|---|---|---|---|---|
| 2007/0162845 | A1* | 7/2007 | Cave | G06F 17/218 715/209 |
| 2007/0174244 | A1* | 7/2007 | Jones | 707/3 |
| 2007/0226192 | A1* | 9/2007 | Vaca | G06F 17/30905 |
| 2008/0016441 | A1 | 1/2008 | Tabin et al. | |
| 2008/0235608 | A1* | 9/2008 | Prabhu | 715/765 |
| 2008/0288955 | A1* | 11/2008 | Brockway et al. | 719/311 |
| 2009/0006356 | A1 | 1/2009 | Liao et al. | |
| 2009/0132500 | A1 | 5/2009 | Jones et al. | |
| 2009/0138356 | A1* | 5/2009 | Pomplun | 705/14 |
| 2009/0208097 | A1* | 8/2009 | Husseini | G06T 7/0026 382/162 |
| 2010/0131492 | A1* | 5/2010 | Nandiraju | G06Q 30/08 707/722 |
| 2010/0268732 | A1* | 10/2010 | Rohan | 707/769 |
| 2011/0102354 | A1* | 5/2011 | Fuyuno | G06F 1/1616 345/173 |
| 2012/0167047 | A1* | 6/2012 | Wyler | H04W 4/00 717/122 |

OTHER PUBLICATIONS

Thomas Claburn; "Google Search Wiki to Customize Search Results"; published Nov. 21, 2008; 2 pages; http://www.informationweek.com/news/internet/search/showArticle.jhtml?articleID=212101424.

Paul N. Bennett, et al.; "Learning Consensus Opinion: Mining Data from a Labeling Game"; 10 pages; published in the 18th International World Wide Web Conference Committee (IW3C2); Apr. 20-24, 2009; Madrid, Spain; ACM 978-1-60558-487-4/09/04.

Paul Thomas, et al.; "Evaluation by Comparing Result Sets in Context"; 8 pages; CIKM'06; Nov. 5-11, 2006; Arlington, Virginia; ACM 1-59593-433-2/06/0011.

Ben Carterette, et al.; "Here or There—Preference Judgments for Relevance"; 12 pages; University of Massachusetts Amherst; Microsoft Research; Microsoft Live Labs.

Ellen M. Voorhees; "Variations in Relevance Judgments and the Measurement of Retrieval Effectiveness"; 9 pages; National Institute of Standards and Technology; Gaithersburg, Maryland; SIGIR'98, Melbourne, Australia; ACM 1-58113-015-5 Aug. 1998.

Thorsten Joachims, et al.; "Accurately Interpreting Clickthrough Data As Implicit Feedback"; 8 pages; Information Science Cornell University; Stanford University; SIGIR'05, Aug. 15-19, 2005; Salvador, Brazil; ACM 1-59593-034-5/05/0008.

Kalervo Jarvelin et al.; "IR evaluation methods for retrieving highly relevant documents"; 9 pages; University of Tampere, Department of Information Studies, Finland; published in Belkin, N.J.; Ingwersen, P. and Leong, M.-K. (eds.); Proceedings of the 23rd Annual International ACM SIGIR Conference on Research and Development in Information Retrieval; New York, NY; ACM, pp. 41-48.

Ben Carterette, et al.; "Learning a Ranking from Pairwise Preferences"; 2 pages; Center for Intelligent Information Retrieval, Department of Computer Science, University of Massachusetts, Amherst, MA; SIGIR'06, Aug. 6-10, 2006, Seattle, Washington; ACM 1-59593-369-7/06/0008.

Chris Burges, et al.; "Learning to Rank using Gradient Descent"; 8 pages; published in Proceedings of the 22nd International Conference on Machine Learning, Bonn, Germany, 2005.

Brian Bartell, et al.; "Learning to Retrieve Information"; 9 pages; Encylopaedia Britannica and Institute for Neural Computation Computer Science & Engineering, University of California, San Diego, CA; supported by NSF grant IRI-9221276.

Stefano Mizzaro; "Measuring the Agreement Among Relevance Judges"; 13 pages; Department of Mathematics and Computer Science, University of Udine, Italy; MIRA Conference, 1999.

Ben Carterette, et al.; "Minimal Test Collections for Retrieval Evaluation"; 8 pages; Center for Intelligent Information Retrieval, Department of Computer Science, University of Massachusetts, Amherst, Massachusetts; SIGIR'06, Aug. 6-11, 2006, Seattle, Washington; ACM 1-59593-369-7/06/0008.

Thorsten Joachims; "Optimizing Search Engines using Clickthrough Data"; 10 pages; Cornell University, Department of Computer Science, Ithaca, New York; SIGKDD 02 Edmonton, Alberta, Canada; ACM 1-58113-567-X/02/0007.

Chris Buckley, et al.; "Retrieval Evaluation with Incomplete Information"; 8 pages; Sabir Research, Inc., Gaithersburg, Maryland; National Institute of Standards and Technology, Gaithersburg, Maryland; SIGIR'04, Jul. 25-29, 2004, Sheffield, South Yorkshire, UK; ACM 1-58113-881-4/04/0007.

Ellen M. Voorhees, et al.; "Experiment and Evaluation in Information Retrieval"; 1 page; TREC, The MIT Press; Sep. 2005; http://www.mitpress.mit.edu/catalog/item/default.asp?ttype=2&tid=10667.

* cited by examiner

EVALUATING PREFERENCES OF CONTENT ON A WEBPAGE

BACKGROUND

A webpage, such as a search results webpage, generally contains various types of digital content. For example, a search results webpage provided in response to a user query oftentimes includes algorithmic results as well as instant answers, such as, for example, weather, news stories, videos, images, or the like. The breadth of digital content types presented to a user enhances the webpage experience for the user.

User preferences regarding the placement, position, or usage of various types of digital content on a webpage can enhance effectiveness, accessibility, and usefulness of a displayed webpage. Such user preferences, however, can prove challenging to recognize. Despite the advantages that exist for providing various types of digital content within a webpage, such as a search results webpage, improvements may still be made, such as, for instance, in evaluating placement, position, and/or usage of various types of digital content.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to facilitating the evaluation of webpage digital content preferences. A user is presented with items of digital content that the user is permitted to manipulate. The items of digital content are relocated within a layout area in accordance with the user's manipulation of the digital content. Preferences regarding the arrangement of digital content are recognized based on the user manipulation and/or relocation. Such preferences are used to subsequently arrange digital content for displaying to a user.

By way of example only, search engines provide users with a variety of search results, including traditional algorithmic results and instant answer results. A user provides preferences regarding the placement, position, or usage of digital content items in the context of other search results. Such preferences may indicate a preference of a type of digital content relative to other types of digital content or a webpage. For instance, a preference might include the placement of one type of digital content over another, such as a weather forecast image placed over a link to a webpage. In other instances, a preference may include the positioning of a particular item of digital content on a side of a user display, as opposed to the center of a screen. Still further examples may include user preferences between two different treatments of the same subcontent. Such preferences can be utilized to present subsequent digital content to the user or a set of users.

BRIEF DESCRIPTION OF THE DRAWINGS

Embodiments of the present invention are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to facilitating the evaluation of webpage digital content preferences. In this regard, user preferences are utilized to analyze and evaluate an optimal or preferred arrangement of webp age digital content within a webpage. Webpage digital content, as used herein, refers to any information that is published or distributed in a digital form on or within a webpage including, for example, text, data, audios, photographs, images, motion pictures, and the like. In embodiments, webpage digital content is digital content in association with a search results webpage that provides search results in response to a query, such as a search query entered by a user. By way of example, such webpage digital content includes algorithmic results and instant answer results. An algorithmic result refers to a search result that is relevant to a search query and, generally, includes a web Uniform Resource Locator (URL) that links to a website relevant to the search query. An algorithmic result oftentimes includes a caption that summarizes the web URL, but can be presented in any format. An algorithmic result might be formatted using only text. Alternatively, in some cases, an algorithmic result might be formatted using mixed media, such as text and an image.

An instant answer refers to a search result that is an answer or response to a search query that is provided to a user on the main search results page. That is, a user is presented with particular details on the search results page in response to a query, whereas the user might otherwise be required to select a link within the search results page to navigate to another webpage and, thereafter, search further for the desired information. For example, assume a user search query is "weather in Seattle." An algorithm result within a search results page might include a URL to weather.com. In such a case, the user can select the URL, transfer to that webpage, and, thereafter, input Seattle to obtain the weather in Seattle. By comparison, an instant answer presented on the search results page contains the weather for Seattle such that a user is not required to navigate to another webpage to find the weather. As can be appreciated, an instant answer might pertain to any subject matter including, for example, weather, news story items, area codes, conversions, dictionary terms, encyclopedia entries, finance, flights, health, holidays, dates, hotels, local listings, math, movies, music, shopping, sports, package tracking, and the like. An instant answer can be in the form of text, a video, an image, a photograph, an audio, a combination thereof, or the like.

To obtain user preferences of digital content arrangement, users are permitted to manipulate the arrangement of digital content so that the digital content is relocated to another position relative to other digital content or to the webpage, as described in more detail below. Based on the user manipulation or relocation of an item or set of items, a user preference(s) of the digital content arrangement can be inferred, identified, recognized, or determined. Such a user preference reflects the user's preference regarding the arrangement of digital content in the context of a webpage. That is, a user's manipulation of one or more items of digital content, in the context of a webpage, or a portion thereof, reveals or provides an insight to the user's preference regarding arrangement of a digital content item(s) in relation to other items of digital content or to the webpage. As a user may be presented with and manipulate a variety of types of digital content (e.g., various algorithmic results and instant answers), the user's manipulation of a particular type of digital content within the context of a webpage, or a portion thereof, provides additional insight into user preferences, particularly with respect to the position, placement, or usage of one type of content as compared to other types of content.

In embodiments, a user preference might be a positional preference, a placement preference, a usage preference, and/or the like. A positional preference refers to a user's preference for a position of a specific type of digital content relative to one or more other types of digital content. By way of example, and not limitation, a positional preference might be a preference for one type of digital content to appear above, below, to the side of, or in some other position relative to another type of digital content. A placement preference refers to a user's preference of the placement of a specific type of digital content within the context of a webpage. That is, a placement preference indicates a placement within a webpage at which a user prefers a particular type of digital content to be located. For instance, a user might prefer that advertisements appear at the bottom of the webpage and that images appear at the top of the webpage. Accordingly, when a user places digital content with a picture above the caption near the top of the layout area, there is a suggestion of a placement preference for locating digital content with illustrations near the top of a webpage. A usage preferences refers to a user's preference to utilize or view a particular type(s) of digital content. In this regard, a usage preference might be indicated in an instance that a user is permitted to select some but not all of a set of digital content, and the user selects only particular types of digital content to place within a layout area, but declines to place other items of digital content.

Upon collecting a set of one or more user preferences, such preferences can be used to identify placement, position, or utilization of various types of digital content in association with a subsequent query or accessing of a webpage. As such, a user can experience a webpage presenting digital content based on a previously obtained user preference(s) or multiple users' preferences (e.g., positional, placement and/or usage preferences). For example, user preferences may be used to direct the arrangement of search results for a subsequent query on a search results page. Alternatively, user preferences may be used to direct the layout of a webpage including multiple items of digital content upon subsequent accessing of the webpage. As such, the display of digital content items on a webpage, including the position of particular items of content such as news stories, weather items, advertisements, and the like, may reflect particular preferences regarding position, placement, or usage.

Accordingly, in one aspect, an embodiment of the present invention is directed to one or more computer-readable media storing computer-useable instructions that, when used by one or more computing devices, causes the one or more computing devices to perform a method. The method includes presenting a user with items of digital content. The method also includes recognizing user preferences based on a user manipulation of the items of digital content in the context of a layout area. The user preferences indicate a preference of a digital content type associated with the manipulated items of digital content relative to other digital content types or a webpage.

In another embodiment, an aspect of the invention is directed to a user interface for manipulating digital content. The user interface includes a first digital content display area configured to display items of digital content. A user is permitted to manipulate the one or more items of digital content. The user interface also includes a second digital content display area configured to receive the manipulated items of digital content. The received manipulated items of digital content indicate a location preference, a position preference, or a usage preference of a digital content type associated with the manipulated items of digital content.

A further embodiment of the present invention is directed to one or more computer-readable media storing computer-useable instructions that, when used by one or more computing devices, causes the one or more computing devices to perform a method. The method includes presenting a user with a first set of digital content items. The first set of digital content items comprising representative algorithmic search results, instant answer search results, and advertisements in association with a search query. Each of the digital content items is associated with a digital content type. The method also includes receiving an indication of a desired placement, position, or usage of a digital content item of the first set of digital content items relative to other digital content items or a webpage. A user provides the indication by manipulating the digital content item of the first set of digital content items in the context of a layout area simulating the webpage. The method further includes determining a user preference based on the indication of the desired placement, position, or usage of the digital content item. The user preference indicates a placement preference, a positional preference, or a usage preference of the digital content type associated with the manipulated digital content item of the first set of digital content items relative to the other digital content items or the webpage. A user search query initiated by a second user is received. The user preference is used to display a second set of digital content items comprising algorithmic search results, instant answer search results, and advertisements related to the user search query. The second set of digital content items are arranged within a subsequent webpage in accordance with the placement preference, the positional preference, or the usage preference of the digital content type.

Figure 1:
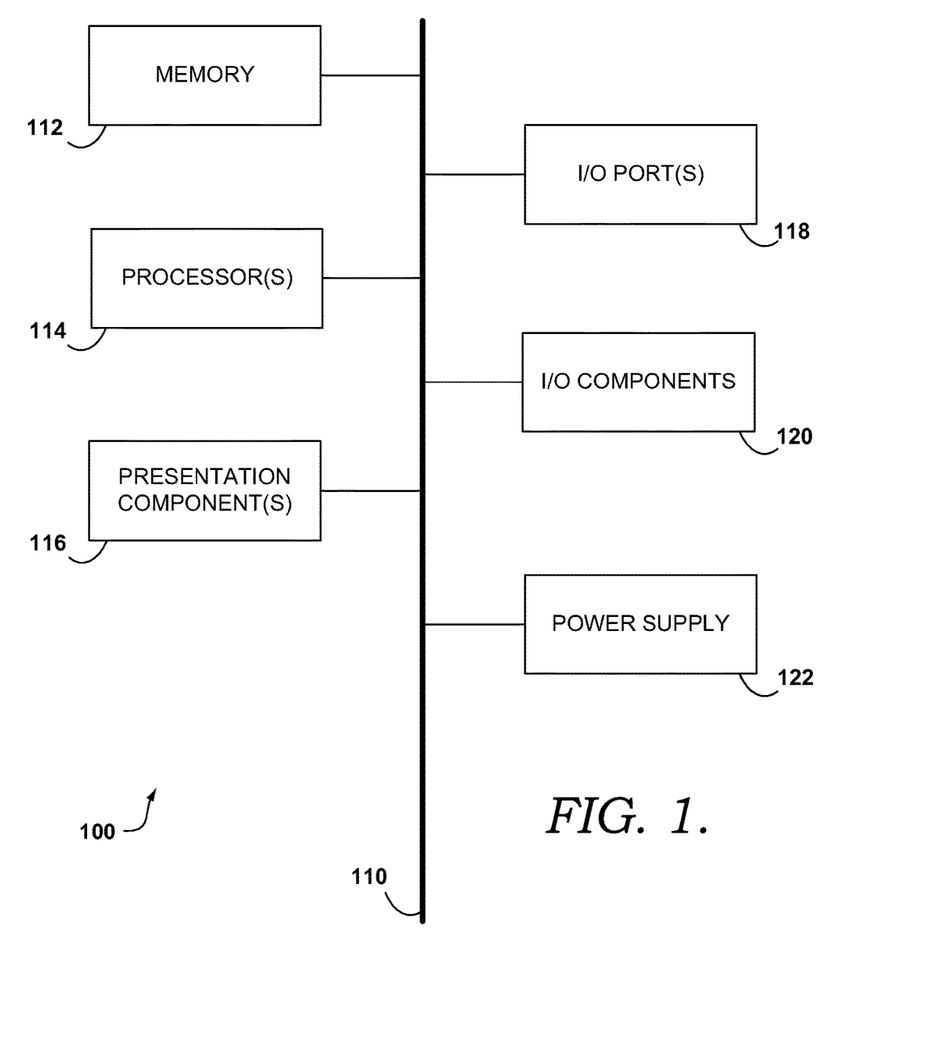
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
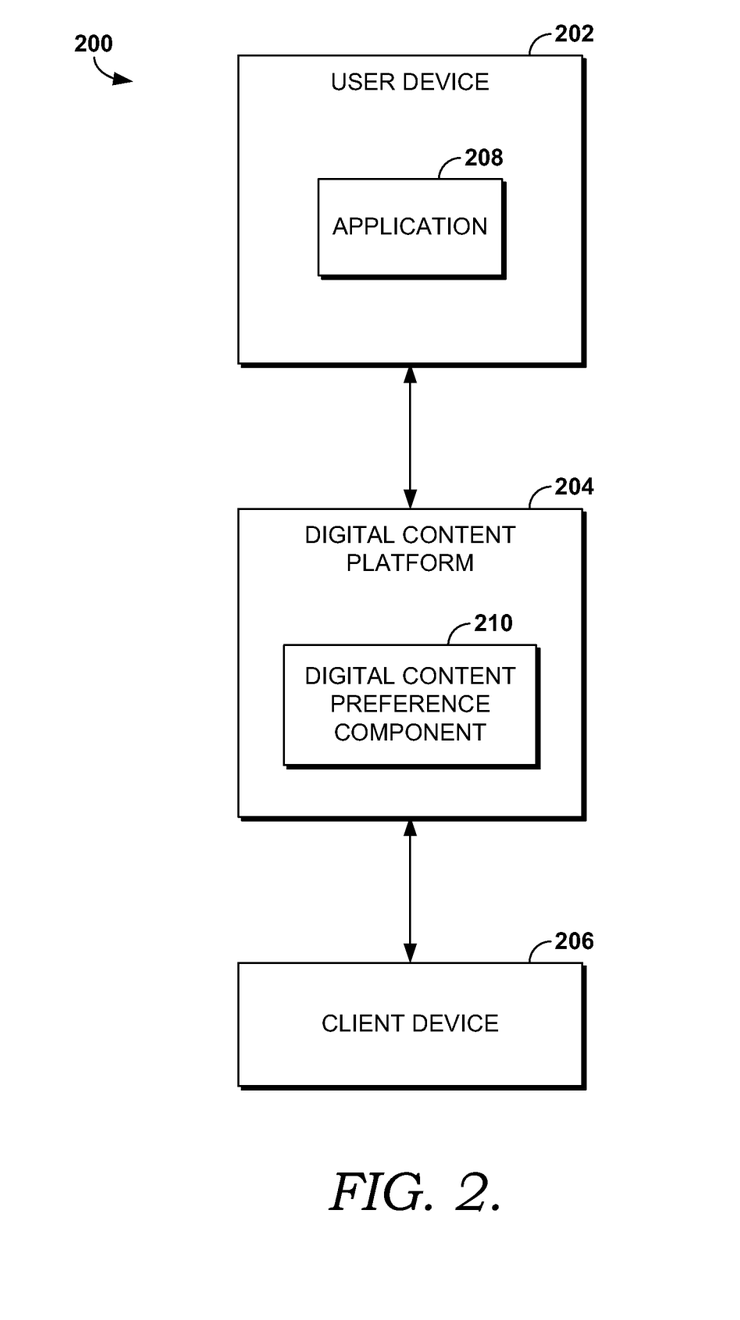
FIG. 2 is a block diagram of an exemplary system in which embodiments of the invention may be employed.

As indicated previously, embodiments of the present invention are directed to facilitating the evaluation of webpage digital content preferences. Among other components not shown, as illustrated in FIG. 2, an exemplary computing system 200 generally includes a user device 202, a digital content platform 204, and a client device 206. The user device 202, the digital content platform 204, and the client device 206 may each include any type of computing device, such as computing device 100 described with reference to FIG. 1, for example. The components of the system 200 may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of user devices, digital content platforms, and client devices may be employed within the system 200 within the scope of the present invention. Each may comprise a single device or multiple devices cooperating in a distributed environment. For instance, the digital content platform may comprise multiple devices arranged in a distributed environment that collectively provide the functionality of the digital content platform described herein. Additionally, other components not shown may also be included with the system 200.

Generally, the system 200 illustrates an environment in which the user device 202 presents a user interface in which a user can manipulate digital content. The user device 202 may be any of a number of different types of devices owned and operated by a user, such as, for instance, a desktop computer, a laptop computer, or a mobile device, such as a phone or media player. The user device 202 includes an application 208 that provides an environment for displaying and manipulating digital content. The application 208 may comprise any type of application in which digital content may be presented and manipulated. By way of example only and not limitation, the application may be a web-browsing application, a stand-alone application, or an application integrated with an operating system or other application of the user device 202.

As used herein, a user refers to any user that can manipulate digital content to indicate user preferences. Accordingly, a user might be a webpage user, such as an individual that navigates to a webpage or provides a user search query to a search engine and navigates a search results page. In such a case, a webpage user might be presented with digital content to be manipulated in association with a user's navigation to a webpage or upon presentation of search results. Alternatively, a user might be a judge that has a function of providing user preferences. In this regard, the user might be a user that initiates and utilizes an application for the purpose of providing data or preferences such that digital content can be subsequently placed, positioned, and/or utilized appropriately. Such a user might be a content provider, an individual associated with a search engine developer or entity, or any other individual designated as a judge.

In one embodiment, a digital content display area and/or a layout area might be displayed to a user via the user device 202 to enable a user to manipulate digital content. A digital content display area refers to an area presented to a user by a display screen of a user device that contains digital content to be manipulated. As previously indicated, such digital content might be any type of digital content, or a representation thereof, including, for example, algorithmic results, instant answers (e.g., images, videos, etc.), or advertisements. A user may be presented with a single item of digital content within a digital content display area. Alternatively, a user may be presented with multiple items of digital content within a digital content display area. In one embodiment, the user is presented with digital content that represents two or more different treatments of the same subcontent. A treatment might include any variation of formatting, such as font style, font size, content layout, etc. For instance, one treatment of a digital content item may be an image with a description directly below the image in italicized font. A second treatment of the same subcontent may be the same image with the same description in bold lettering to the right of the image.

In accordance with embodiments, the user may be presented with digital content that includes search results associated with a search result query. For instance, the user may be presented with search results that correspond with a query for "Seattle Weather." The search results provided to a user may include homogeneous or heterogeneous results. Heterogeneous results are a set of results that include multiple types of search results (i.e., digital content). That is, heterogeneous results may contain a combination of traditional algorithmic results, variations of instant answer results, and/or advertisements. For instance, heterogeneous search results may include website URLs, news items, pictures, videos, advertisements, etc. As such, for the query "Seattle Weather," a user may be presented with weather-related webpage results, an image of a weather forecast, and an advertisement for a Seattle tourism company. Homogeneous results are a set of results that include a single type of search results. For instance, the digital content presented to the user might contain only algorithmic results.

A layout area refers to an area presented to a user by a display screen of a user device that is utilized for manipulating digital content. The layout area to which digital content within the digital content display area is relocated may initially be populated with other items of digital content or may initially be empty. In this regard, a user might insert one or more search results presented to the user into a layout area which already contains other results relevant to the same query. Similarly, a user might compose a results list based on the user's preferences for placement of the results by manipulating search results into a layout area that does not already contain other search results. As can be appreciated, a layout can be presented in any format. In embodiments, a layout area simulates or replicates a presentation of a webpage, or a portion thereof. In such a case, a user can manipulate digital content within the context of a webpage.

In one implementation, a user manipulates digital content presented within a digital content display area by moving the digital content items into a layout area to indicate a user preference of a position, placement, or usage of the digital content items relative to other items or the webpage. A user can manipulate digital content using any method including, for example, a drag-and-drop technique, a cut and paste technique, or any other method that can be used to indicate position, placement, or usage of digital content items. In accordance with a user manipulation, the application 208 receives an indication of a desired placement, position, or usage of the manipulated digital content item.

User manipulation of digital content items into a layout area may include inserting one or more of the items of digital content in the context of other items of digital content in the layout area. The other items of digital content in the layout area may include a variety of different types of digital content, or may include the same type of digital content as that which is presented to the user in the digital content display area. By inserting the digital content into a layout area which already contains other items of digital content, the items of digital content originally presented in the layout area may be relocated relative to the newly-inserted items of digital content. For instance, by manipulating one item of digital content from the digital content displaying area to the right side of a layout area, the content already presented in the layout area may be relocated to the left side of the layout area.

In other embodiments, manipulation of the digital content may include arranging one or more of the items of digital content in the digital content display area into a layout area that does not already contain other items of digital content. For instance, a user may determine the placement of all of the items of digital content in the digital content display area relative to each other by manipulating some or all of the items into a layout area which did not contain any other digital content prior to the user's manipulation. In further embodiments, the user may manipulate an item of digital content from the digital content display area by moving the item into a trash area indicating deletion or removal of the item of digital content. For instance, the user may be presented with three items of digital content, but choose to manipulate only two of the three items of digital content into the layout area, leaving the third item of digital content in the digital content display area. Instead of leaving the unselected item of digital content in the digital content display area, the user may choose to manipulate the item into the trash section of the display for deletion or removal from the list of items of digital content.

In embodiments, a user may be given a specific task to perform when manipulating digital content. For instance, the user may be presented with one or more items of digital content, and also be given the specific task instructing the user's manipulation of the item. By way of example only, and not limitation, one instruction to the user may be to "Construct a Homepage for a Search Engine." Another task may instruct a user to "Build a Search-Results Page for the Query 'Seattle Weather.'" In embodiments, a user may manipulate some or all of the items of digital content in response to the task requested of the user.

One or more user preferences of digital content placement, position, or usage are inferred, identified, recognized, or determined based on a user's manipulation, the corresponding relocation of digital content relative to other digital content or to the webpage, or the received indication of a desired placement, position, or usage of the manipulated digital content item. In embodiments, preferences might be associated with or determined for digital content or a type of digital content for a set of one or more users, a set of one or more webpages, a set of one or more search results pages, a set of one or more search queries, or the like. In one embodiment, inferences regarding user preferences may be obtained after one user's manipulation of one or more items of the same type or different types of digital content in the context of the layout area. In further embodiments, user preferences may be inferred after multiple users' manipulate one or more items of the same type or different types of digital content in the context of the layout area. Such a detection of user preferences might be additionally or alternatively performed by the digital content platform 204.

The digital content platform 204 comprises a system for utilizing user preferences to generate rules associated with subsequent displays of digital content. As noted above, the digital content platform 204 may comprise a single computing device, although it's likely that the digital content platform 204 would be implemented via multiple computing devices in a distributed computing environment. As shown in FIG. 2, the digital content platform includes a digital content preference component 210 that utilizes user preferences to generate rules associated with subsequent displays of digital content. A rule, as used herein, refers to any rule, setting, or algorithm that is derived at least in part from one or more user preferences and is used to display webpage digital content in a particular arrangement in accordance with the user preferences.

In some cases, the digital content preference component 210 determines user preferences. In such a case, the digital content preference component 210 utilizes user manipulation performed via the user device 202 to establish preferences of digital content for generating rules to utilize when presenting digital content to the user or to other users. In this regard, the digital content preference component 210 uses one or more user manipulations to determine the relative placement, position, and/or usage of digital content, or a type thereof, with respect to other digital content items, or a type thereof, or a webpage.

Additionally or alternatively, the digital content preference component 210 might obtain user preferences from one or more user devices, such as user device 202. User preferences might be collected and stored within a database. Such a database might reside within the user device 202 and/or the digital content platform 204. Accordingly, in some cases, user preferences can be received or retrieved from multiple user devices and stored within a database of the digital content platform 204. In this regard, the digital content preferences may be elicited from a single user with respect to a single type of digital content, multiple users with respect to a single type of digital content, a single user with respect to multiple types of digital content, multiple users with respect to multiple types of digital content, or the like.

The digital content preference component 210 might generate a rule or set of rules using all user preferences or a particular set of user preferences. In this regard, the established rules can be used for presentation digital content based on digital content preferences. That is, a generated rule can be used to subsequently arrange digital content within a webpage in accordance with one or more preferences. For instance, a rule might be generated using preferences of a particular set of one or more users, preferences associated with a particular set of one or more webpages, preferences associated with a particular set of one or more search queries, preferences associated with a particular set of one more digital content, preferences associated with a particular set of one or more types of digital content, or the like.

A rule or a set of rules may apply to or be associated with one type of digital content or with multiple types of digital content. In some instances, a rule established based on the digital content preferences of a single user may be specific to that particular user. In other instances, a rule established by the digital content preferences of a single user or group of users may be applied to the presentation of digital content to other users. A rule may be generated for a type of digital content to be presented to a particular user, a particular set of users, or all users. Similarly, a rule for a type of digital content might be generated for a particular set of one or more webpages, search result pages, and/or search queries. As can be appreciated, a rule or a set of rules can be updated and/or altered as a result of obtaining additional user preferences and/or establishing new rules.

The client device 206 presents digital content in accordance with the determination of preferences of digital content or type of digital content, as determined by the digital content preference component 210. In this regard, the client device 206 may present digital content in accordance with rules established by the digital content preference component 210. The client device 206 may be any of a number of different types of devices owned and operated by a client, such as, for instance, a desktop computer, a laptop computer, or a mobile device, such as a phone or media player. As used herein, a client refers to any entity that can receive or view digital content presented on a display screen of a computing device. Accordingly, a client might be the user who manipulated the user data on user device 202. In such a case, the user device 202 and the client device 206 might present digital content to a user on the same display. Similarly, digital content preferences elicited from the user's manipulation of digital content may be used to present digital content to the same user on the same device. Alternatively, a client might be any client that receives or views the display of digital content. Such a client might be a an individual accessing a webpage, an individual accessing a search results page for a search engine, or any other client that receives or views the display of digital content incorporating a digital content arrangement based on previously obtained user preferences. As can be appreciated, in some cases the rules might be communicated to another computing device that outputs the display of digital content to the client device 206. In such a case, the additional computing device might be associated with a webpage administrator, a content provider, etc.

Figure 3:
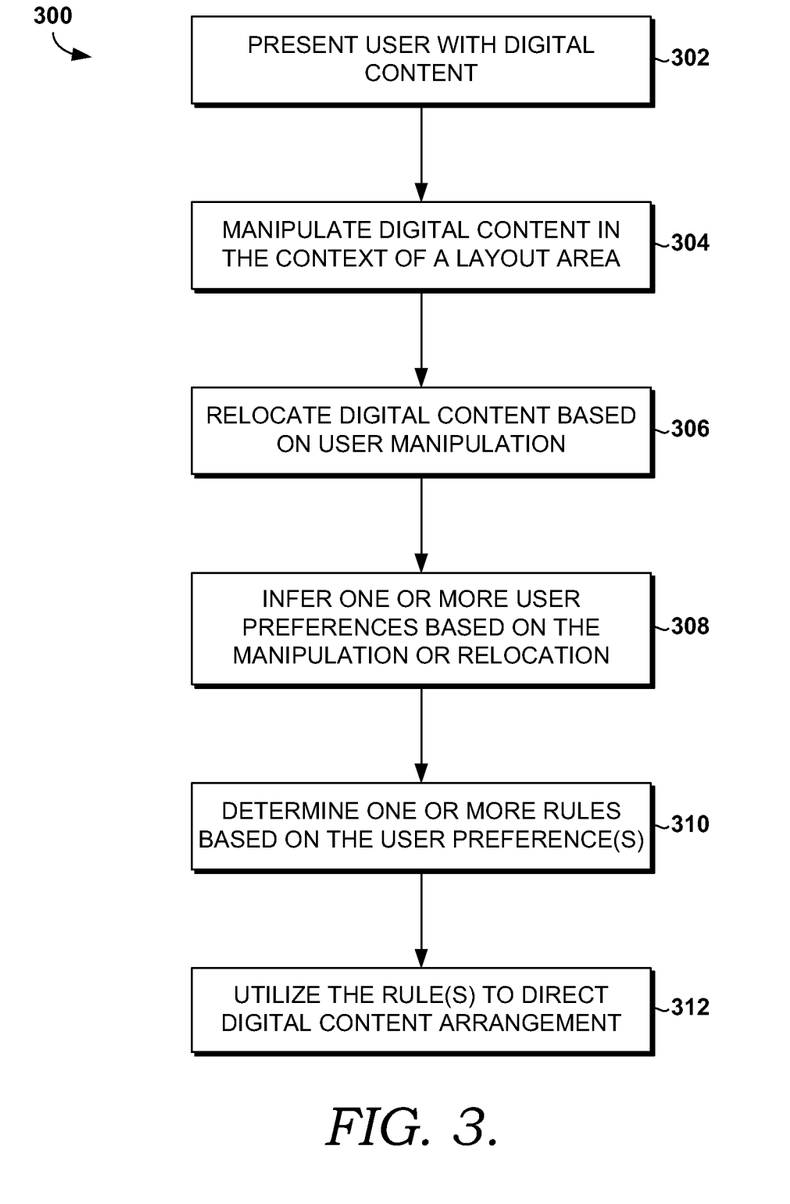
FIG. 3 is a flow diagram showing a method for evaluating the placement of content on a webpage in accordance with an embodiment of the present invention.

Referring now to FIG. 3, a flow diagram is provided that illustrates a method 300 for facilitating the evaluation of webpage digital content preferences in accordance with an embodiment of the present invention. Initially, as shown at block 302, a user is presented with one or more items of digital content. Such digital content items might be presented within a digital content display area. As discussed previously, the user may be presented with a single item of digital content. Alternatively, a user may be presented with multiple items of digital content. In accordance with embodiments, the user may be presented with digital content that includes search results from a search result query. For instance, the user may be presented with search results for a query for "Seattle Weather." The search results provided to the user may include homogeneous or heterogeneous results. Heterogeneous results may contain traditional algorithmic results, as well as instant answer results. For instance, the search results may include website URLs, news items, pictures, videos, advertisements, etc. Additionally, for the query "Seattle Weather," the user may be presented with a weather-related webpage result, an image of a weather forecast, and an advertisement for a Seattle tourism company. Alternatively, homogeneous results may be displayed to the user. For instance, the digital content presented to the user could contain results only including webpage results.

A user might be prompted to manipulate the digital content displayed to the user. As shown at block 304, digital content is manipulated in the context of a layout area. In some embodiments, digital content is manipulated in accordance with a user's preference of a particular position, placement, or usage of a type of digital content relative to other digital content items, or type thereof, relative to a webpage. Digital content can be manipulated within the context of a layout area that simulates a webpage. As such, the digital content manipulated in the context of a simulated webpage may be done so in accordance with the user's desire to position, place, or use of a type of digital content relative to other digital content items when presented in the context of a webpage.

At block 306, the digital content is relocated in accordance with the user's manipulation. The user manipulation and/or relocation of digital content is utilized to infer a user preference. This is indicated at block 308. In some embodiments, the preference may be positional preference, where a user prefers one position relative to another position based on the type of digital content. Another preference includes a placement preference, where a user tends to select particular types of digital content for placement near a particular part of the layout area. Yet another form of preference determined by the user's manipulation of digital content includes a usage preference, where a user is permitted to select some but not all of a set of digital content.

As shown at block 310, one or more rules are determined based on the user preference(s) gathered from the user manipulation of digital content. These rules may be used for directing the arrangement of digital content associated with subsequent use of a webpage. That is, rules are utilized to direct digital content arrangement. In this regard, a user's manipulation of digital content in the context of the layout area can be used at a later time to direct digital content arrangement within a webpage. As such, by way of example only, a user may manipulate certain types of digital content to the top of the layout area, in the context of other items of digital content. A preference gathered based on this manipulation may be used to establish a rule for webpage display of the same or similar types of content. In embodiments where the digital content consists of search results, the user's manipulation of such content can be used to direct the placement of search results, or types of search results, on a search engine results page.

Digital content preferences in the context of a webpage can be evaluated in a variety of different settings. For illustrative purposes only, FIGS. 4-10 include exemplary screen displays showing interfaces for facilitating the evaluation of webpage digital content preferences in accordance with various embodiments of the present invention. It will be understood and appreciated by those of ordinary skill in the art that the screen displays of FIGS. 4-10 are provided by way of example only and are not intended to limit the scope of the present invention in any way.

Figure 4:
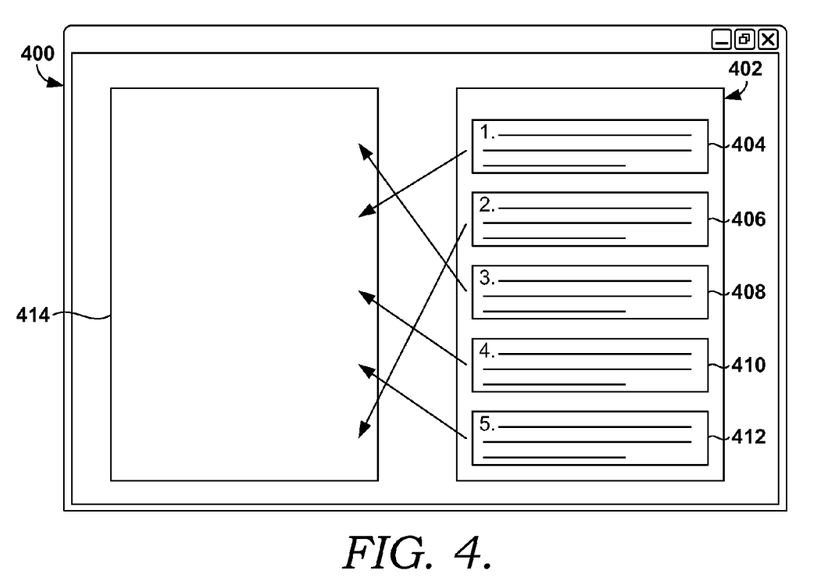
FIG. 4 illustrates a first user interface for evaluating the placement of content on a webpage in accordance with an embodiment of the present invention.

With reference initially to FIG. 4, an illustrative screen display 400 used to manipulate digital content items is shown. As shown in FIG. 4, the user interface shown in the screen display 400 includes digital content display area 402 with digital content items 404-412. The interface also includes layout area 414. Although the digital content items 404-412 are shown with undifferentiated types of content, it will be understood and appreciated that the type of digital content included in display area 402 may vary. Further, content items 404-412 may contain identical types of content, varying types of content, or different treatments for the same subcontent. The screen display 400 permits a user to manipulate the digital content in display area 402 into layout area 414. For instance, the user may manipulate some or all of the content for relocation into layout area 414. Based on the user's manipulation of one or more of the digital content items 404-412, one or more user preferences regarding placement, position, or usage can be determined.

Figure 5:
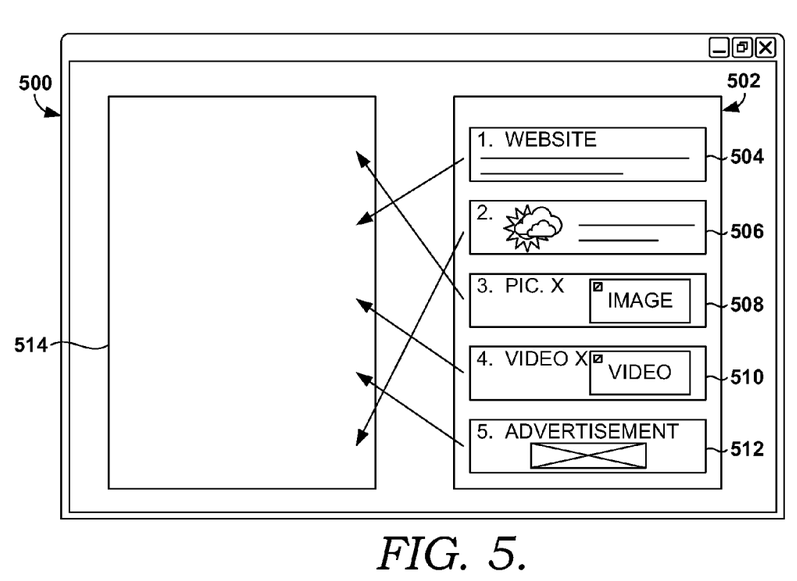
FIG. 5 illustrates a second user interface for evaluating the placement of content on a webpage in accordance with an embodiment of the present invention.

Referring to FIG. 5, an illustrative screen display 500 used to manipulate digital content items is shown. FIG. 5 illustrates screen display 500 with a digital content display area 502, digital content items 504-512, and layout area 514. Although the digital content items 504-512 are shown as a website item, weather item, picture item, video item and an advertisement item depicting varying types of digital content, it should be understood that digital content display area 502 may display different types of digital content not depicted in FIG. 5. Similarly, in some embodiments, more than one item of the same type of digital content is displayed in digital content display area 502. The screen display 500 permits a user to manipulate the digital content in display area 502 into layout area 514. In this regard, user preferences regarding the placement, position, or usage of a particular type of digital content can be indicated.

Figure 6:
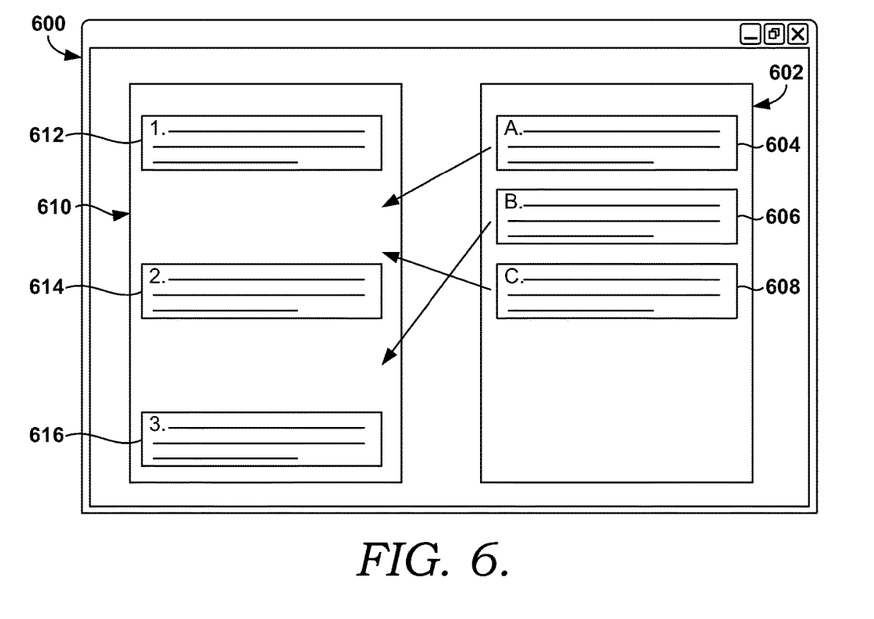
FIG. 6 illustrates a third user interface for evaluating the placement of content on a webpage in accordance with an embodiment of the present invention.

With reference now to FIG. 6, an illustrative screen display 600 for manipulating digital content is shown. FIG. 6 illustrates screen display 600 with a digital content display area 602 and digital content items 604-608. The display area also includes a layout area 610 with digital content items 612-616. It should be understood that digital content items 604-608 in display area 602, as well as digital content items 612-616 in layout area 610, may include of a variety of types of digital content, and are not limited to one type of digital content. The screen display 600 permits a user to manipulate the digital content in display area 602 into layout area 610. The user may manipulate some or all of the digital content presented in display area 602. It should be understood that, in some cases, the placement of digital content items 612-616 is not constrained, and could be repositioned in layout area 610 based on the user manipulation of digital content items 604-608 into layout area 610. Further, the user is not limited to inserting items 604-608 into any particular portion of layout area 610. For instance, digital content item 606 could be inserted above digital content item 612. Additionally, digital content item 608 could be manipulated to be placed beside digital content item 612. It will be understood and appreciated by those of ordinary skill in the art that the manipulation of some or all of digital content items 604-608 into layout area 610 can be arranged in a variety of ways depending on the user's placement, position, and usage preferences.

Figure 7:
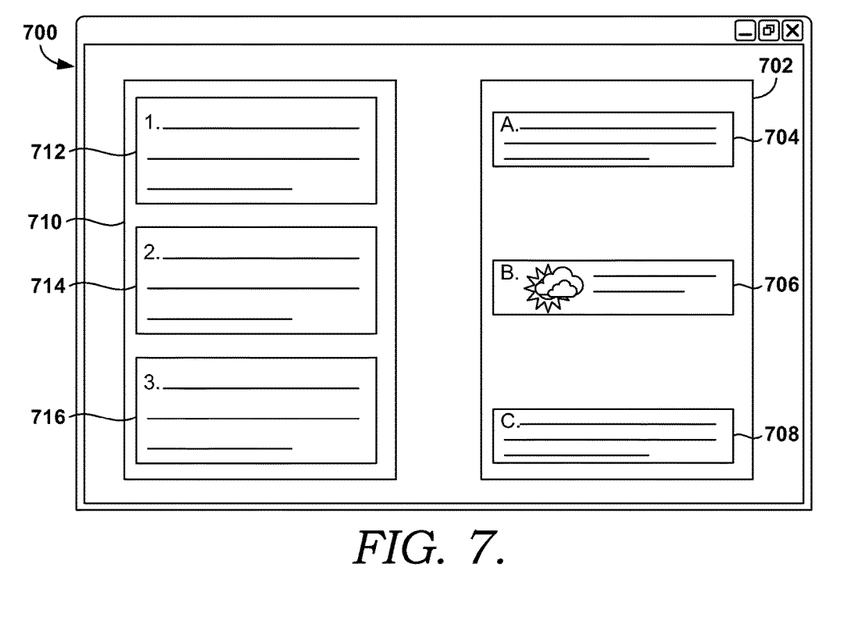
FIG. 7 illustrates a fourth user interface for evaluating the placement of content on a webpage in accordance with an embodiment of the present invention.

Referring to FIG. 7, an illustrative screen display 700 for manipulating digital content is shown. FIG. 7 illustrates screen display 700 with digital content display area 702 containing digital content items 704-708, and layout area 710 with digital content items 712-716. A user is permitted to manipulate digital content items 704-708 in the context of layout area 710. It should be understood that the user's manipulation of digital content items 704-708 is not restricted by the presence of digital content items 712-716. Rather, the user's manipulation of digital content items 704-708 in the context of digital content items 712-716, and the subsequent relocation of some or all of the items of digital content, will provide the basis for user preferences.

Figure 8:
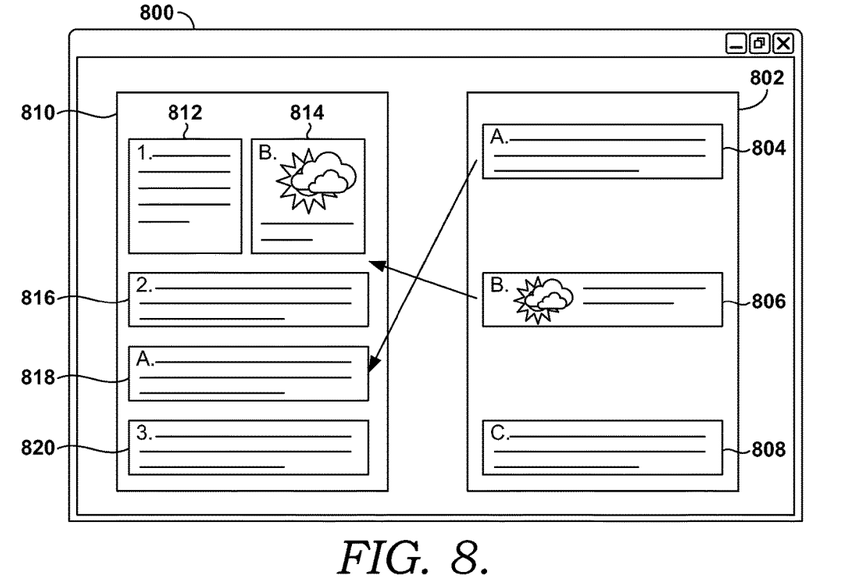
FIG. 8 illustrates a fifth user interface for evaluating the placement of content on a webpage in accordance with an embodiment of the present invention.

As related to FIG. 7, referring now to FIG. 8, an illustrative screen display 800 for manipulating digital content is shown. FIG. 8 illustrates screen display 800 with digital content display area 802 and digital content items 804-808. The display also contains layout area 810 and digital content items 812-820. Layout area 810 demonstrates where a user, permitted to manipulate digital content items 804-808, has manipulated those items of digital content into layout area 810. In accordance with the user manipulations, digital content items 804-808 are relocated, as displayed in layout area 810. It should be understood that the user's manipulation of digital content items 804-808 is not restrained by the positioning of digital content items 812, 816, and 820. Instead, the user may manipulate one or more of digital content items 804-808 anywhere within the context of layout area 810. In this instance, the user manipulated digital content items 804 and 806. As a result of the manipulation of digital content items 804 and 806, the items are relocated into layout area 810 as digital content items 818 and 814, respectively. It should further be understood that, in some embodiments, the user manipulation of digital content items 804 and 806 into layout area 810, and resulting relocation of these items, enables the inference of one or more user preferences regarding the arrangement of digital content. In particular, a preference may be identified based on the user's manipulation of digital content item 806 to the top of layout area 810. Further, a preference may be recognized based on the user's manipulation of digital content item 806 to the right side of digital content item 812 or to the upper right-hand corner of the layout area 810. Even further, a preference may be identified in accordance with the user's manipulation of digital content item 806 above digital content items 816 and 820, and further above digital content item 804 that was relocated into the position of digital content item 818. It should be understood that digital content items 804-808 are not restrained to one type of digital content, and that a variety of types of digital content may be presented to a user. In such cases, user preferences pertaining to the placement, position, and usage of particular types of digital content can be inferred. Alternatively, digital content items 804-808 may include the same type of digital content.

Figure 9:
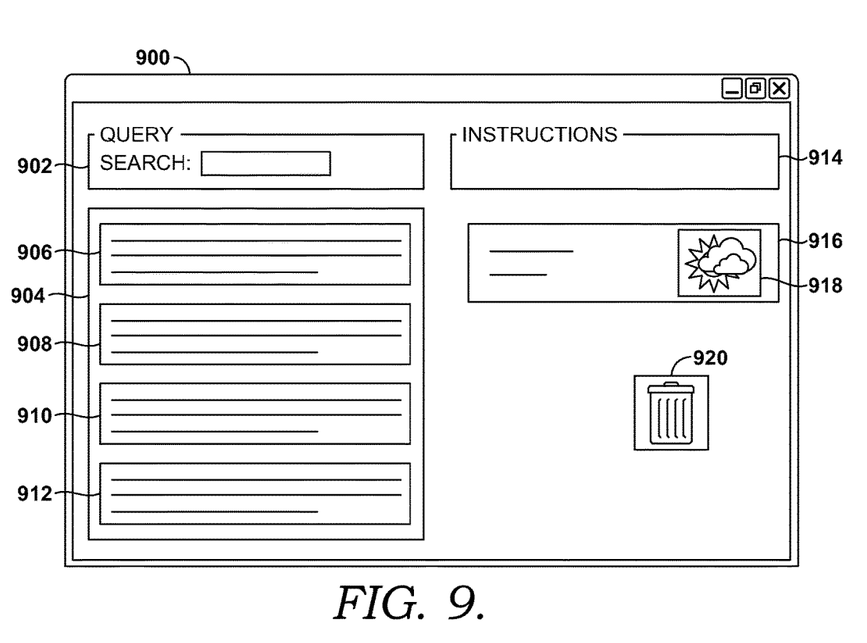
FIG. 9 illustrates a sixth user interface for evaluating the placement of search results in accordance with an embodiment of the present invention.

With reference now to FIG. 9, an illustrative user interface 900 for manipulating digital content is shown. FIG. 9 illustrates user interface 900 with query display 902, layout area 904 with digital content items 906-912, instructions area 914, digital content display area 916 with digital content item(s) 918, and discard area 920. It should be understood that layout area 904 may contain any number of the same or different types of digital content items. It should be further understood that digital content display area 916 may contain more than one item of digital content of the same or different type. Instruction area 914 can be used to direct the user's placement of items of digital content from digital content display area 916 into layout area 904. Instruction area 914 can also be used to instruct a user to manipulate digital content items from digital content display area 916 into either layout area 904 or discard area 920. The user's manipulation of a digital content items into either layout area 904 or discard area 920 can be used to infer user preferences regarding the usage of one type of digital content compared to another. For example, assume that a user moves a digital content item into the discard area 920. In such a case, an inference may be made that the particular digital content item or the type of digital content item associated therewith is not desired to be included in a subsequent presentation of search results. It should be understood that the types of digital content found in either layout area 904 or in digital content display area 916 can be any number of different types of digital content, including an advertisement, a weather image, a video, a website URL, etc.

Query display 902 can be used to indicate the relationship between the types of digital content item(s) 918 that the user is permitted to manipulate, as well as the types of digital content that may already be present in layout area 904. For instance, where the digital content items presented to the user are search results from a search results query, the query display 902 indicates the type of query that was run to populate either layout area 904 with digital content, digital content area 916 with digital content item(s) 918, or both. By way of example, a query for "Seattle Weather," as indicated in query display 902, may generate items of digital content 906-912 from one or more sources to populate layout area 904. Similarly, the one or more items of digital content item(s) 918 presented to the user in digital content layout area 916 may be related to or derived from the same query for "Seattle Weather." As such, the user's manipulation of digital content item(s) 918 into layout area 904 indicates the user's preferences with respect to digital content item(s) 918, as related to the query "Seattle Weather."

Figure 10:
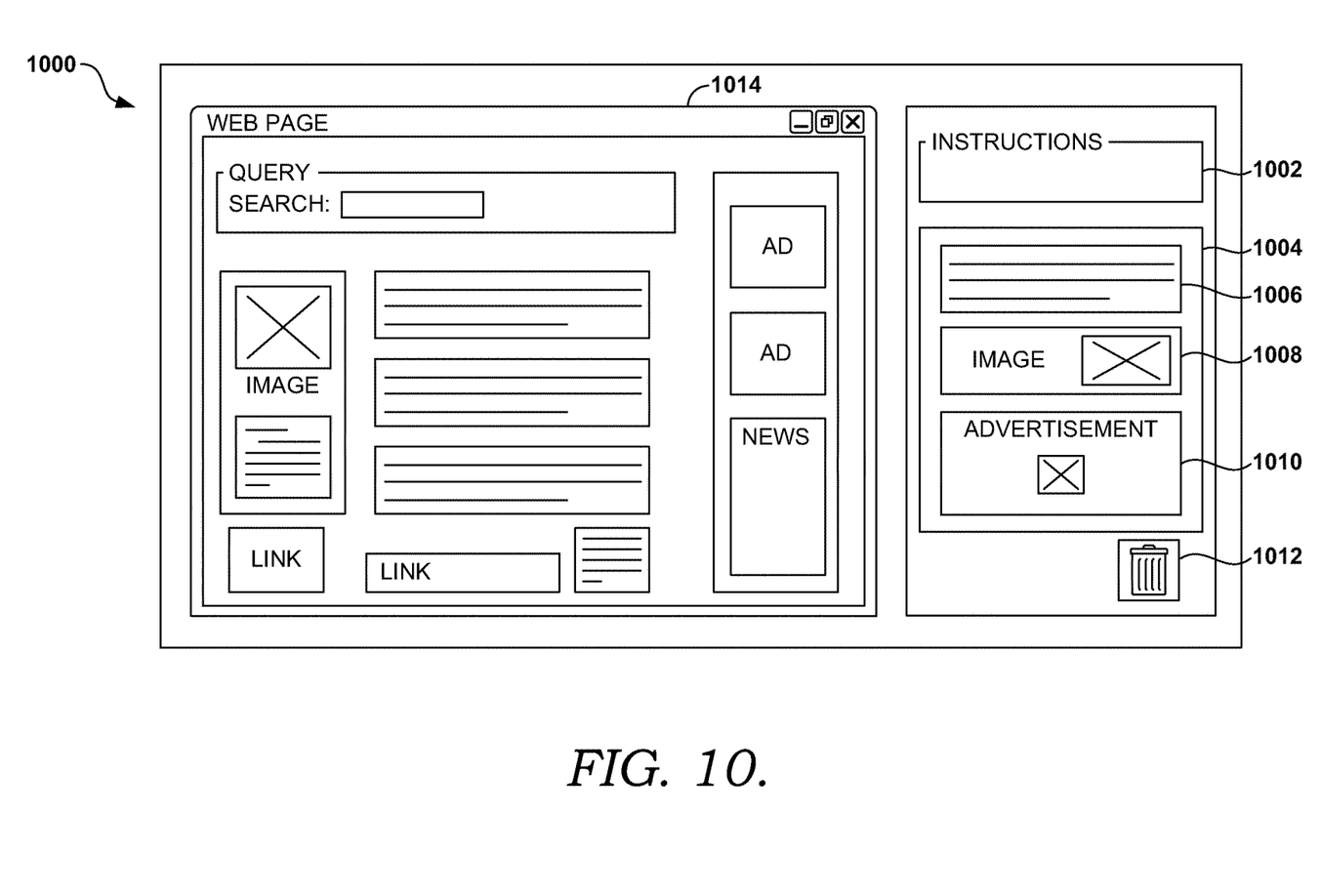
FIG. 10 illustrates a seventh user interface for evaluating the placement of search results in accordance with an embodiment of the present invention.

Finally, referring now to FIG. 10, an illustrative user interface 1000 for manipulating digital content is shown. FIG. 10 illustrates user interface 1000 with instruction area 1002, digital content display area 1004 with digital content items 1006-1010, discard area 1012, and layout area 1014. Digital content display area 1004 may contain any number of digital content items 1006-1010. Instruction area 1002 may be configured to display instructions to a user to manipulate digital content items 1006-1010 from digital content display area 1004 into layout area 1014. Instruction area 1002 may instruct a user with a specific task, such as, for example, directing a user to "Construct a Webpage Display," from digital content items 1006-1010 presented in digital content display area 1004. Alternatively, a user may be instructed to "Construct a search-results page for query 'Seattle Weather.'" As such, the user's manipulation of digital content items 1006-1010 may be driven by the instructions given in instruction area 1002, and may reflect a user's preferences for particular types of digital content when manipulating digital content items 1006-1010 based on a specific task. It should be understood that instruction area 1002 and/or discard area 1012 may be included, but is not required to be, inside digital content display area 1004. Layout area 1014 illustrates digital content displayed to simulate the appearance of a webpage. It should be understood that the digital content items contained in layout area 1014 can include any of a number of different types of digital content, including search results, search queries, webpage URLs, advertisements, news story items, images, video, and the like.

As can be understood, embodiments of the present invention gather user preferences regarding digital content on a webpage. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, causes the one or more computing devices to perform a method comprising:
   providing a user with (1) one or more items of digital content in a digital content display area where the user is permitted to directly manipulate the one or more items of digital content, (2) a separate and simultaneously displayed layout area that simulates a webpage, and (3) a task to perform through the direct manipulations of the one or more items of digital content;
   recognizing one or more user preferences for a particular digital content type based on the user's direct manipulation of at least one of the one or more items of digital content, wherein the user's direct manipulation includes a user relocating the at least one of the one or more items of digital content from the digital content display area into the separate and simultaneously-displayed layout area simulating the webpage,
   wherein the one or more user preferences indicate a preference regarding one or more of position, placement, and usage of the particular digital content type as compared to other digital content types, and wherein the particular digital content type corresponds to the at least one of the one or more items of digital content manipulated by the user.

2. The one or more computer storage media of claim 1, wherein the layout area contains an initial set of one or more digital content items.

3. The one or more computer storage media of claim 1, wherein each of the one or more user preferences comprise a placement preference, a positional preference, or a usage preference regarding arrangement of digital content for displaying to a user.

4. The one or more computer storage media of claim 3, wherein the positional preference indicates a preference of a position of the particular digital content type that corresponds to the at least one of the one or more items of digital content manipulated by the user relative to the one or more other digital content types, the placement preference indicates a preference of a placement of the digital content type that corresponds to the at least one of the one or more items of digital content manipulated by user relative to a webpage, and the usage preference indicates a preference of usage of the digital content type that corresponds to the at least one of the one or more items of digital content manipulated by the user.

5. The one or more computer storage media of claim 1, wherein the method further comprises:
   based on the one or more user preferences inferred from the direct manipulation with the layout area simulating the webpage, determining one or more rules for subsequently arranging one or more of a set of items of digital content within a second webpage; and
   utilizing the rules to direct the subsequent arrangement of the set of one or more items of digital content within the second webpage.

6. The one or more computer storage media of claim 1, wherein the one or more items of digital content consists of one or more search results from a search engine query.

7. The one or more computer storage media of claim 6, wherein the user directly manipulates the at least one of the one or more search results by composing a list of search results within the layout area, wherein the layout area is empty prior to the user's direct manipulation.

8. The one or more computer storage media of claim 6, wherein the user is permitted to directly manipulate the at least one of the one or more search results by inserting the at least one of the one or more search results into a list of search results presented in the layout area.

9. The one or more computer storage media of claim 1, wherein at least one of the one or more items of digital content contains an instant answer search result that the user is permitted to directly manipulate within the context of other items of digital content.

10. The one or more computer storage media of claim 1, wherein the one or more items of digital content presented to the user includes a plurality of digital content types, each of the digital content types comprising an algorithmic search result or an instant answer search result.

11. The one or more computer storage media of claim 1, wherein the items of digital content are search results and the webpage simulated is a search results page.

12. A user interface on a computing device for manipulating digital content, the user interface comprising:
   a first digital content display area displaying one or more items of digital content to be manipulated by a user in order to indicate one or more of a placement preference, a position preference, and a usage preference and a task to execute through manipulation of the one or more items of digital content, wherein each of the one or more items of digital content is associated with a corresponding digital content type; and
   a second digital content display area that is a simulation of a webpage and is separate from and simultaneously displayed with the first digital content display area, wherein the second digital content display area directly receives the one or more items of digital content manipulated by the user based on relocation by the user of the one or more items of digital content from the first digital content display area to the second digital content display area, wherein the relocation by the user of the one or more items of digital content indicate the one or more of the placement preference, the position preference, and the usage preference of the digital content type corresponding to the one or more items of digital content manipulated by the user as compared to other digital content type.

13. The user interface of claim 12, wherein the user interface further comprises:
   a query display area for displaying a query utilized to generate the one or more items of digital content in the first digital content display area.

14. The user interface of claim 12, wherein the user interface further comprises:
   a discard area where the user can discard at least one of the one or more items of digital content displayed to the user in the first digital content display area.

15. The user interface of claim 12, wherein the second digital content display area contains an initial set of one or more items of digital content, and wherein the user manipulates at least one of the one or more items of digital content from the first display area to the second digital content display area to indicate the one or more of the placement preference, the position preference, and the usage preference of the at least one of the one or more items of digital content manipulated by the user as compared to the initial set of one or more items of digital content.

16. The user interface of claim 12, wherein the user manipulates the one of more items of digital content by dragging the one or more items of digital content into the second digital content display area.

17. The user interface of claim 13, wherein the one or more items of digital content comprises one or more of a search result, a news story, a picture, a video, or a website URL.

18. A digital content platform comprising:
a digital content preference component comprising one or more processors that:
utilize one or more user manipulations of digital content performed within a simulated webpage to determine user preferences regarding display of digital content, wherein the user preferences indicate one or more of a placement preference, a position preference, and a usage preference of a first digital content type as compared to other digital content types;
based on the user preferences, generate one or more rules associated with subsequent displays of digital content within a non-simulated webpage to a user, wherein the one or more rules are derived from the user preferences inferred from the one or more user manipulations within the simulated webpage and are used to display digital content in a particular arrangement in the non-simulated webpage in accordance with the user preferences inferred from the one or more user manipulations within the simulated webpage; and
apply the one or more rules derived from the user preferences to subsequently arrange digital content of the first digital content type within the non-simulated webpage in accordance with the user preferences, wherein the digital content is arranged within the non-simulated webpage according to the one or more rules generated based on the one or more user manipulations within the simulated webpage in response to a search query input received subsequent to the generation of the one or more rules.

* * * * *